(12) United States Patent
Hassan et al.

(10) Patent No.: US 6,866,234 B1
(45) Date of Patent: Mar. 15, 2005

(54) METHOD AND DEVICE FOR ALTERING THE SEPARATION CHARACTERISTICS OF AIR-FLOW OVER AN AERODYNAMIC SURFACE VIA INTERMITTENT SUCTION

(75) Inventors: Ahmed A. Hassan, Mesa, AZ (US); Ram D. JanakiRam, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 10/630,882

(22) Filed: Jul. 29, 2003

(51) Int. Cl.$^7$ .................................................. B64C 21/08
(52) U.S. Cl. ......................... 244/208; 244/209; 244/204
(58) Field of Search ................................ 244/208, 209, 244/130, 199, 204, 201

(56) References Cited

U.S. PATENT DOCUMENTS

| | | | |
|---|---|---|---|
| 5,054,720 A | * 10/1991 | Page | ........................... 244/199 |
| 5,938,404 A | 8/1999 | Domzalski et al. | |
| 6,092,990 A | 7/2000 | Hassan et al. | |
| 6,234,751 B1 | 5/2001 | Hassan et al. | |
| 6,302,360 B1 | * 10/2001 | Ng | ............................... 244/203 |
| 6,471,477 B2 | 10/2002 | Hassan et al. | |
| 6,543,719 B1 | 4/2003 | Hassan et al. | |

* cited by examiner

*Primary Examiner*—Charles T. Jordan
*Assistant Examiner*—T. Nguyen
(74) *Attorney, Agent, or Firm*—Thompson Coburn LLP

(57) ABSTRACT

Active flow control devices and methods are disclosed for improving the aerodynamic efficiency of airfoils. The devices and methods pertain to applying intermittent suction or intake of low-energy boundary layer fluid into airfoils in a manner delaying or eliminating boundary layer separation.

21 Claims, 4 Drawing Sheets

METHOD AND DEVICE FOR ALTERING THE SEPARATION CHARACTERISTICS OF AIR-FLOW OVER AN AERODYNAMIC SURFACE VIA INTERMITTENT SUCTION

BACKGROUND OF THE INVENTION

The aerodynamic performance, hence efficiency, of an airfoil, such as a rotor blade, wing, turbine/compressor blade, or windmill blade, is strongly dependent on the ratio of the lift-to-drag (L/D ratio) forces generated by the airfoil. To this end, active flow control (AFC) techniques have been utilized to increase the L/D ratio of such airfoils. These AFC techniques include providing ports and/or openings through the surface of such airfoils and applying steady blowing, steady suction, or alternating blowing and suction of fluid therefrom. Such AFC techniques have proven to be effective in increasing the lift coefficient of an airfoil, decreasing the drag coefficient, or both in a manner increasing the overall L/D ratio of the airfoil, and thereby increasing the airfoil's aerodynamic efficiency.

AFC techniques are particularly advantageous in situations where large flow separations over airfoils would otherwise exist. Such situations are common on flapped airfoils during periods when relatively high lift is being generated. As is the case with the deployment of virtually all types of aerodynamic control surfaces, a drag penalty is usually incurred as a result of the deflection of a trailing edge flap system (be it a simple hinged plain flap or a more complex multiple-element slotted flap such as a Fowler flap). This drag penalty is a direct result of the creation of a local separated flow region whose size depends on the free stream angle of attack, the flow speed, the flap chord length, and the flap deflection angle. By reducing or delaying flow separation, a corresponding increase in lift and/or reduction in drag can be achieved.

SUMMARY OF THE INVENTION

The present invention pertains to an AFC technique of applying intermittent suction or intake of fluid through the exterior surface of an airfoil in a manner reducing or delaying flow separation over the airfoil. This technique requires less power than is required with constant suction or constant blowing AFC techniques and provides for a greater reduction in drag as compared to oscillating suction/expulsion AFC methods.

In a first aspect of the invention, a device comprises an airfoil, a fluid (gas or liquid) inlet opening, a fluid outlet opening, a pump, and first and second valves. The airfoil has an exterior surface and the fluid inlet opening extends through the exterior surface of the airfoil. The fluid outlet opening is separate from the fluid inlet opening. The pump is operatively connected to the fluid inlet opening and to the fluid outlet opening and is configured and adapted to draw fluid into the fluid inlet opening and to expel fluid from the fluid outlet opening. The first valve is operatively connected between the fluid inlet opening and the pump and the second valve is operatively connected between the pump and the fluid outlet opening. The first valve is configured and adapted to allow fluid to be drawn into the airfoil via the fluid inlet opening and to prevent fluid from being expelled from the airfoil via the fluid inlet opening. The second valve is configured and adapted to allow fluid to be expelled from the airfoil via the fluid outlet opening and to prevent fluid from being drawn into the airfoil via the fluid outlet opening.

In a second aspect of the invention, a method comprises providing a device having an airfoil. The airfoil has an exterior surface and a fluid passageway. The device also has a fluid inlet opening that extends through the exterior surface of the airfoil and a fluid outlet opening that is separate from the fluid inlet opening. The method further comprises intermittently drawing fluid into the fluid passageway of the airfoil from an environment external to the device via the fluid inlet opening in manner defining a plurality of intake time intervals separated by a plurality of non-intake time intervals. During the intake time intervals, fluid is drawn into the fluid passageway via the fluid inlet opening. Conversely, fluid is not drawn into the fluid passageway via the fluid inlet opening during the non-intake time intervals. The method yet further comprises intermittently expelling fluid from the fluid passageway of the airfoil into the external environment via the fluid outlet opening in a manner defining a plurality of expulsion time intervals separated by a plurality of non-expulsion time intervals. During the expulsion time intervals, fluid is expelled from the fluid passageway via the fluid outlet opening. Conversely, fluid is not expelled from the fluid passageway via the fluid outlet opening during the non-expulsion time intervals. At least some of the expulsion time intervals occur simultaneously with at least some of the non-intake time intervals.

In a third aspect of the invention, a method comprises providing a device having an airfoil, fluid inlet and fluid outlet openings, and a valve. The airfoil has an exterior surface and a fluid passageway. The fluid inlet opening extends through the exterior surface of the airfoil and the fluid outlet opening is separate from the fluid inlet opening. The valve is movable between opened and closed positions and is configured and adapted to prevent fluid from flowing through the inlet opening when in its closed position and to allow fluid to flow through the inlet opening when in its opened position. The method further comprises drawing fluid into the fluid passageway of the airfoil from an environment external to the device via the fluid inlet opening. The drawing of fluid into the fluid passageway via the fluid inlet opening occurs with the first valve in its opened position. Yet further, the method comprises expelling fluid from the fluid passageway of the airfoil into the external environment via the fluid outlet opening.

While the principal advantages and features of the invention have been described above, a more complete and thorough understanding of the invention may be obtained by referring to the drawings and the detailed description of the preferred embodiments which follow.

Figure 1:
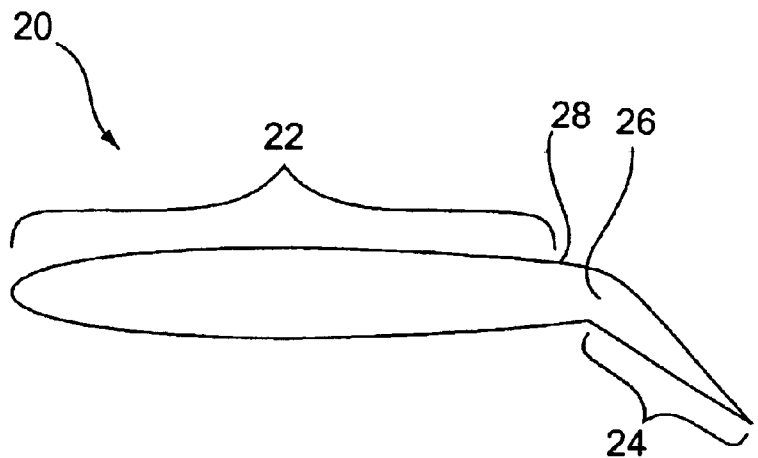
FIG. 1 depicts an airfoil utilized in connection with the preferred method of practicing the invention.

Reference characters in the written specification indicate corresponding items shown throughout the drawing figures.

DETAILED DESCRIPTION OF THE PREFERRED EMBODIMENT OF THE INVENTION

For purposes of testing the preferred method of practicing the invention, an NACA-0012 airfoil 20, as shown in FIG. 1, was utilized. The airfoil 20 has a leading edge portion 22 and a trailing edge flap portion 24. The flap portion 24 constitutes twenty percent of the airfoil's chord and was assumed to be deflected forty degrees. However, it should be appreciated that the invention can be utilized on various types of airfoils, with or without movable control surfaces such a flaps. Moreover, the invention can be utilized in connection with airfoils on various types of devices, including, but not limited to, fan blades, turbine blades, aircraft wings, and aircraft rotor blades.

The AFC technique of the present invention is of particular benefit in situations where separation of fluid flow over an airfoil would normally (i.e., without AFC) occur. This being said, to achieve the aerodynamic benefits associated with the invention, it is helpful to identify the location on an airfoil where flow separation occurs when AFC techniques are not utilized. This can be easily identified via a simple wind tunnel test or through the use of commercially available computational fluid dynamics analysis tools. For the test airfoil 20, the Reynolds number was assumed to be approximately one million, and it was assumed that the airfoil was moving through air at a free stream Mach number of 0.10 and at a free stream (onset flow) angle of attack of zero degrees. Based on analysis of the non-AFC flow around the airfoil 20, it was determined that flow separation occurs on the shoulder of the flap on the exterior surface of the airfoil facing the direction of lift (i.e., the upper surface as shown).

Figure 2:
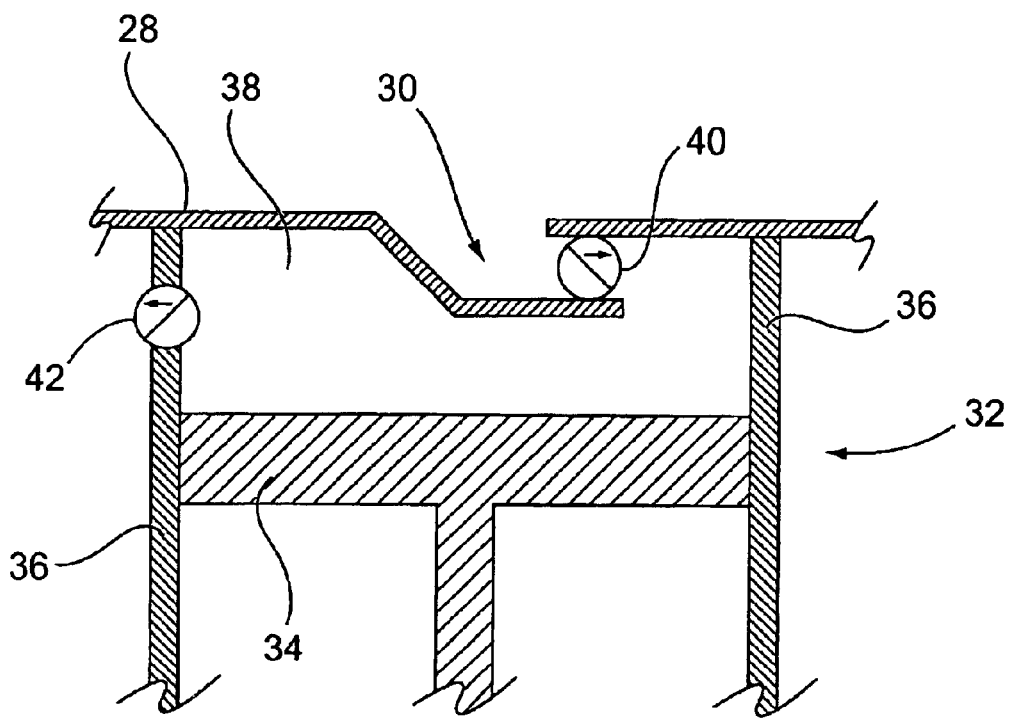
FIG. 2 is a partial cross-sectional view of the airfoil shown in FIG. 1 and depicts a pump an valve arrangement for practicing the invention.

In view of the location of the non-AFC flow separation, intermittent suction or gas intake was introduced on the exterior surface 28 of the shoulder 26 of the flap 24 at the non-dimensional chord station of 0.82. The intermittent suction was applied at a frequency of 156 Hertz and at a peak suction Mach number, Mjet, of 0.30. In the preferred method of practicing the invention, air is drawn through the exterior surface 28 of the airfoil 20 via a slot 30 that forms a fluid inlet opening, as shown in FIG. 2. The slot 30 preferably has a nondimensional width of 0.0035 (i.e., the slot width divided by airfoil chord length) and is configured and adapted to draw air in at an angle of 25 degrees relative to the local surface tangent of the surrounding exterior surface 28 of the airfoil 20 (mainly from toward the leading edge of the airfoil).

The partial vacuum pressure required to draw air into the slot 30 can be achieved be various devices and techniques know in the art. Preferably, a pump placed in the leading edge portion 22 of the airfoil 20 (not shown) is operatively connected to the slot 30 for such purposes. However, for illustrative purposes, a simplified representation of a pump, valve, and slot assembly is shown in FIG. 2. The pump 32 preferably comprises a linearly reciprocating piston 34 that moves relative to a cylinder wall 36 in a manner periodically increasing and decreasing the volume of a fluid chamber 38. However, the partial vacuum pressure can be achieved be various other devices or methods, including continuous non-linearly reciprocating pumps such as centrifugal pumps. Nonetheless, the piston 34 of the pump 32 is preferably linearly reciprocated via an electromagnetic actuator such as a voice-coil (not shown).

The assembly also preferably comprises first and second valves 40,42 (shown schematically). The first valve 40 is operatively connected between the fluid chamber 38 and the slot 30 and is movable between opened and closed positions. With the first valve 40 in its opened position, the fluid chamber 38 is in fluid communication with the fluid environment surrounding the airfoil via the slot 30. Conversely, fluid communication between the fluid chamber 38 and the external environment via the slot 30 is prevented when the first valve 40 is in its closed position.

The second valve 42 is operatively connected between the fluid chamber 38 and a fluid outlet opening (not shown). The fluid outlet opening is separate from the fluid inlet opening formed by the slot 30, but can otherwise be located anywhere on the device that comprises the airfoil 30. For example, in the case where the airfoil forms a portion of the wing of an aircraft, the fluid outlet port is preferably positioned inboard of the wing root and the structure of the wing cavity forms a fluid conduit between the fluid chamber 38 and the fluid outlet opening. This being said, the second valve 42 is movable between opened and closed positions. With the second valve 42 in its opened position, the fluid chamber 38 is in fluid communication with the fluid environment surrounding the airfoil via the fluid outlet opening. In its closed position, the second valve 42 prevents fluid from flowing from the fluid chamber 38 through the fluid outlet opening. The first and second valves 40,42 can actuated between their opened and closed positions via an electronic solenoids, commercially available vibration shakers, linear motors, mechanical cams, or other suitable force generating devices or by one-way check valves that are actuated merely by pressure differentials acting between opposite ports of each valve.

In operation, as the piston 34 moves relative to the cylinder wall 36 in a manner increasing the volume of the fluid chamber 38, the first valve 40 is in its opened position and the second valve 42 is in its closed position. This creates a partial vacuum within the fluid chamber 38 and acts to draw or suck low-energy boundary layer fluid from the external environment into the fluid chamber via the slot 30. Alternatively, in the case where a constant vacuum source is utilized, merely opening the first valve 40 will achieve this same result (the second valve is not needed in such systems). After a time interval of intake has occurred, the first valve 40 is moved to its closed position and the second valve 42 is moved to its opened position. With the valves switched, the piston 34 is moved relative to the cylinder wall 36 in a manner decreasing the volume of the fluid chamber 38 and thereby causes fluid within the fluid chamber to pass through the second valve and ultimately out of the fluid outlet opening. During this period, intake of fluid into the airfoil 20 via the slot 30 does not occur. After a time interval of non-intake occurs, the process is repeated such that there are a plurality of intermittent intake and non-intake time intervals that cycle, preferably at a rate of 156 Hertz.

It should be appreciated that the use of a reciprocating pump as described above will result in an intake velocity that increase and then decreases (generally in a sinusoidal manner) during each intake time interval. On the other hand, if a continuous vacuum pump is utilized, the intake velocity may be more constant during each intake interval.

Figure 3:
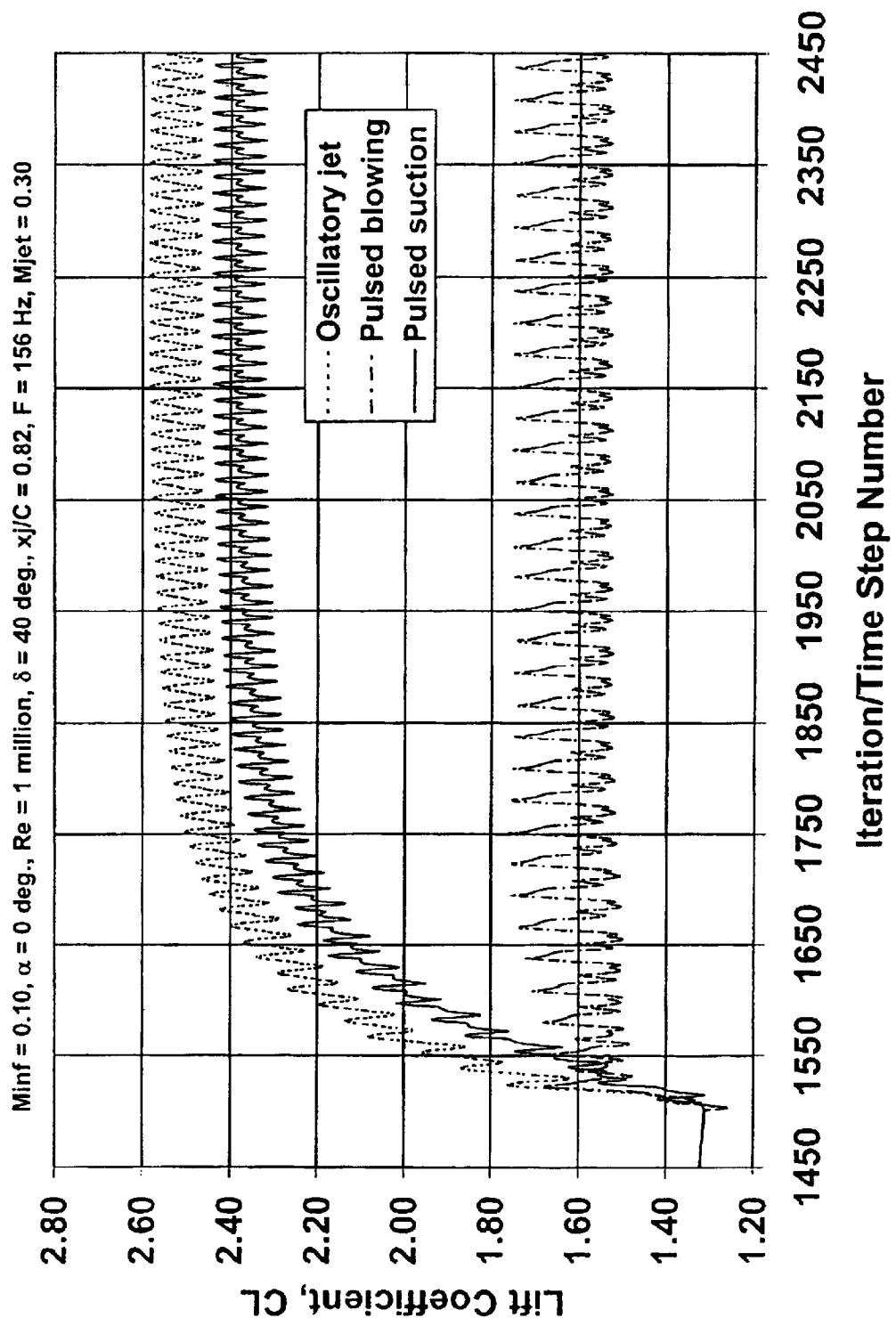
FIG. 3 is graph showing lift coefficient increases generated by utilizing the preferred method of practicing the invention as compared to increases obtained by other prior art AFC methods.
Figure 4:
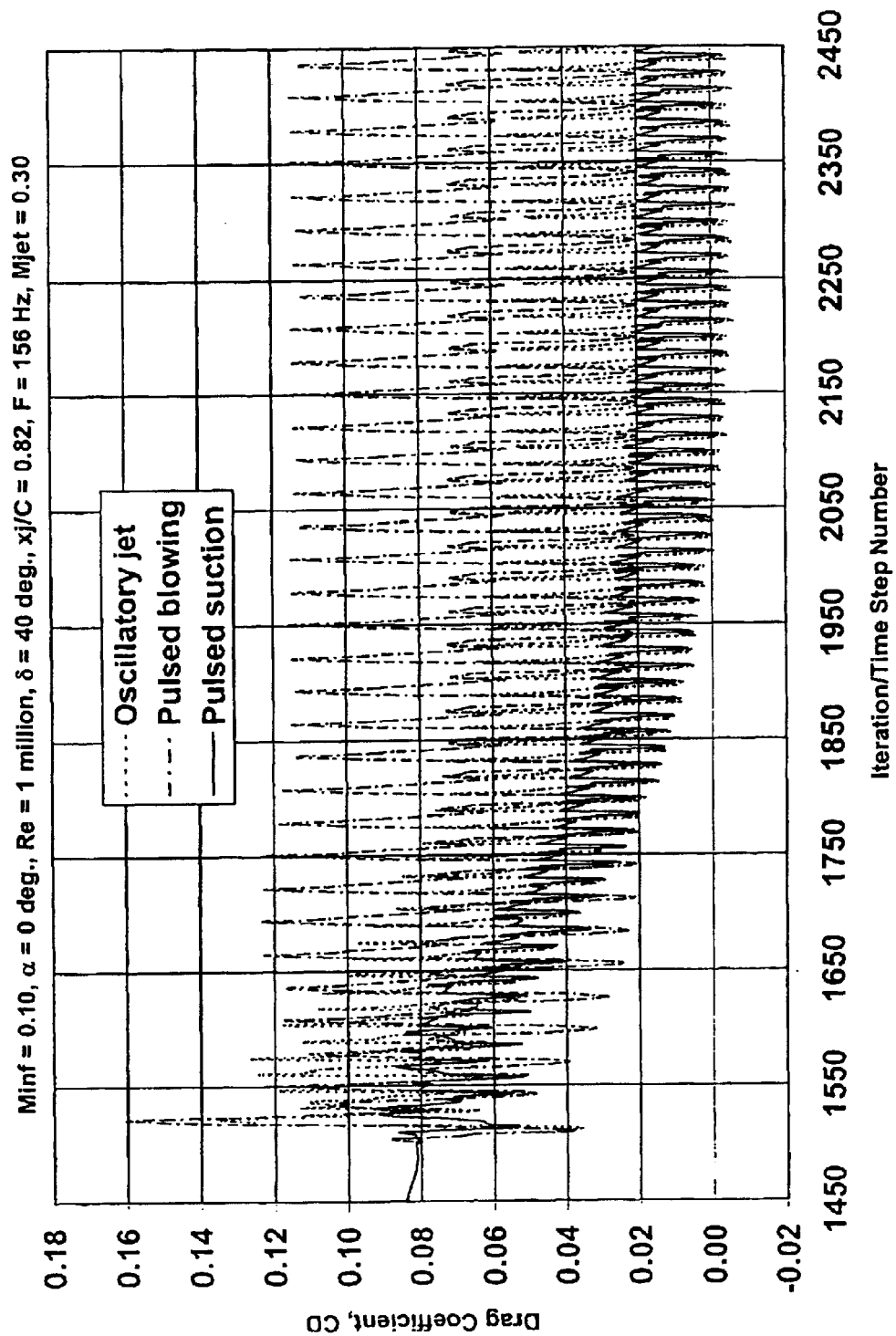
FIG. 4 is graph showing the drag coefficient decreases obtained by utilizing the preferred method of practicing the invention as compared to decreases obtained by other prior art AFC methods.
Figure 5:
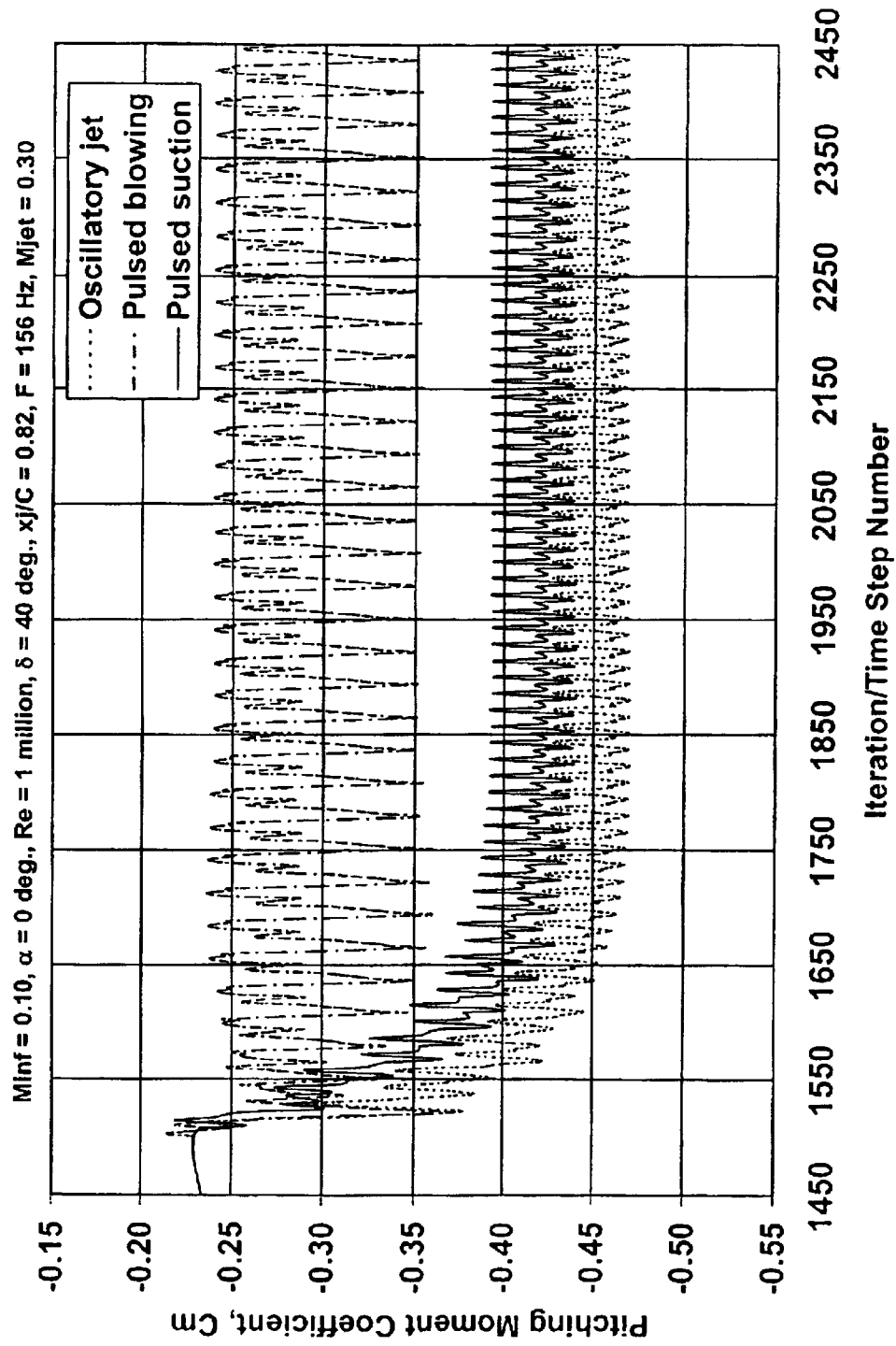
FIG. 5 is graph showing the pitching moment coefficient generated by practicing the preferred method of practicing the invention as compared pitching moments obtained by other prior art AFC methods.

The aerodynamic benefits achieved by the invention are shown in the graphs of FIGS. 3–5. These graphs each show a comparison of the intermittent suction AFC technique of the invention compared to a pulsed (periodic) blowing AFC technique and to an oscillatory (reversing blowing and suction/zero-net-mass) AFC technique.

FIG. 3 illustrates a time history of the airfoil lift coefficient when using the intermediate suction AFC technique of the invention. For contrast, the results for the baseline airfoil (i.e., without the use of any AFC technique) yield a mean lift coefficient of 1.32. The intermittent suction technique in accordance with the present invention yields a mean lift coefficient of 2.39. For comparison to other AFC techniques, the oscillatory technique yields a lift coefficient of 2.5 and the oscillatory technique yields a lift coefficient of 1.6. Clearly, while an oscillatory technique results in the largest enhancement (95%) in lift, the intermittent suction/intake technique of the present invention is close in comparison (81% enhancement) and far greater than results obtain via the pulsed blowing technique (25% enhancement).

The advantages of the intermittent suction/intake technique of the present invention become clear when comparing the lift enhancement results to the drag reduction results. Such drag results are shown in FIG. 4, which illustrates the predicted time history of the airfoil drag coefficient for the various methods. The baseline (non-AFC controlled) airfoil yields a mean drag coefficient of 0.080. In contrast, the mean drag coefficient yielded by the various AFC techniques are: 0.062 for the pulsed blowing AFC technique; 0.024 for the oscillatory AFC technique; and only 0.010 for the intermittent suction/intake technique of the present invention. These results indicate that the use of intermittent suction technique of the present invention provides for the largest reduction in sectional drag (88%), while the oscillatory technique results in an appreciable reduction (63%), and the periodic blowing technique only a relatively slight reduction (21%).

Combining the lift and drag results, the approximate L/D ratios resulting from the various AFC control techniques are: 25.8 for a pulsed blowing technique; 99.58 for the oscillatory technique; and 250 for the intermittent suction/intake technique of the present invention. In contrast, the baseline airfoil has a lift-to-drag ratio of only 16.5. From these results, it should be appreciated that the intermittent AFC technique of the present invention is capable of achieving a lift-to-drag ratio that is 2.5 times larger than that obtained by using an oscillatory AFC technique, and that is 15 times larger than that of the uncontrolled baseline airfoil. This significant enhancement in the airfoil's L/D ratio is a direct consequence of the significant reduction in drag and the moderate increase in airfoil lift due to the application of intermittent suction.

The impact of the various AFC techniques on the pitching moment coefficients for the flapped NACA-0012 test airfoil are shown in FIG. 5. As can bee seen from this figure, the oscillatory AFC technique produces the largest negative pitching moments and the intermittent suction technique of the present invention produces a similar, albeit slightly less, moment. The pulsed blowing technique results in moment coefficient much closer to the −0.23 moment coefficient generated by the baseline airfoil. It should be appreciated that an increase in the magnitude of the pitching moment can be equally achieved using the baseline airfoil by increasing the trailing edge flap deflection or increasing the cord length of the flap, albeit at the expense of significantly higher drag values. Hence, it should also be appreciated that the intermittent suction AFC technique of the present invention can also be viewed as a technique for actively altering the magnitude of the airfoil pitching moment without the traditional need for a larger flap chord and/or flap deflections.

In view of the foregoing, it should be appreciated that the implementation of the intermittent suction AFC technique of the present invention enhances the aerodynamic performance of airfoils (aerodynamic surfaces) by providing modest increases in lift that are simultaneously accompanied by very large reductions in drag. This is primarily a consequence of reattaching the otherwise separated boundary layer flow over at least a portion of the flap. For high-lift systems on commercial and military aircraft and rotorcraft, the use of present invention to control/postpone boundary layer separation as a result of the deployment of flaps directly translates into significantly higher lift-to-drag ratios, more efficient aerodynamic components, less complex high-lift systems, and, as a result, more efficient vehicle configurations. Current high-lift flap systems utilize heavy and bulky motors/hydraulic actuators that necessitate complex wiring, plumbing, and the use of intricate valve systems for channeling and administering the hydraulic fluid to the different segments of complex flap systems. The intermittent suction AFC technique of the present invention requires significantly less complex hydraulic systems to actuate much simpler flap systems and achieves superior performance. Moreover, the intermittent AFC technique of the present invention can also enhance the performance of airfoils during stall or post-stall conditions when large regions of separated flow would otherwise exist. Yet further, the intermittent suction AFC technique of the present invention can be utilized on non-aircraft devices to produce high lift-to-drag airfoils.

In view of the forgoing, many advantages of the preferred method of practicing the invention should be appreciated. However, it should be understood that all matter contained in the above description or shown in the accompanying drawing is intended to be interpreted as illustrative and not in a limiting sense and that various modifications and variations to the preferred method may be employed without departing from the scope of the invention defined by the following claims. For example, it should be appreciated that, as discussed above, a second valve 42 would not necessarily be needed in a device utilizing a constant source of partial vacuum pressure, such a centrifugal pump, in lieu of a reciprocating pump. Moreover, not all of the steps of the preferred method of practicing the invention need to be performed, nor need to be performed in any particular order, to practice the claimed invention. Thus, other possible variations and modifications of the preferred method should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, to the extent the term "portion" is used in the claims or is added by amendment, such term should be construed as meaning some or all of the item or element that it qualifies.

What is claimed is:

1. A device comprising:

an airfoil having an exterior surface;

an fluid inlet opening extending through the exterior surface of the airfoil;

an fluid outlet opening separate from the fluid inlet opening;

a pump operatively connected to the fluid inlet opening and the fluid outlet opening, the pump being configured and adapted to draw fluid into the fluid inlet opening and to expel fluid from the fluid outlet opening; and first and second valves, the first valve being operatively connected between the fluid inlet opening and the pump and the second valve being operatively connected between the pump and the fluid outlet opening, the first valve being configured and adapted to allow fluid to be drawn into the airfoil via the fluid inlet opening and to prevent fluid from being expelled from the airfoil via the fluid inlet opening, the second valve being configured and adapted to allow fluid to be expelled from the airfoil via the fluid outlet opening and to prevent fluid from being drawn into the airfoil via the fluid outlet opening.

2. A device in accordance with claim 1 wherein the device is an aircraft that further comprises a wing and wherein the airfoil constitutes a portion of the wing.

3. An aircraft in accordance with claim 2 wherein the wing comprises a flap that forms a portion of the airfoil and that is movable relative to another portion of the airfoil, the fluid inlet opening extending through a portion of the exterior surface of the airfoil that forms a portion of the flap.

4. An aircraft in accordance with claim 2 wherein the fluid outlet opening is external to the wing.

5. A device in accordance with claim 1 wherein the first and second valves are one-way check valves.

6. A device in accordance with claim 1 wherein the pump comprises a member that partially bounds a fluid chamber and that is configured and adapted to linearly reciprocate in a manner so as to increase and decrease the volume of the fluid chamber.

7. A method comprising:
providing a device having an airfoil, the airfoil having an exterior surface and a fluid passageway, the device also having a fluid inlet opening that extends through the exterior surface of the airfoil and a fluid outlet opening that is separate from the fluid inlet opening;
intermittently drawing fluid into the fluid passageway of the airfoil from an environment external to the device via the fluid inlet opening in manner defining a plurality of intake time intervals separated by a plurality of non-intake time intervals, fluid being drawn into the fluid passageway via the fluid inlet opening during the intake time intervals, fluid not being drawn into the fluid passageway via the fluid inlet opening during the non-intake time intervals;
intermittently expelling fluid from the fluid passageway of the airfoil into the external environment via the fluid outlet opening in a manner defining a plurality of expulsion time intervals separated by a plurality of non-expulsion time intervals, fluid being expelled from the fluid passageway via the fluid outlet opening during the expulsion time intervals, fluid not being expelled from the fluid passageway via the fluid outlet opening during the non-expulsion time intervals, at least some of the expulsion time intervals occurring simultaneously with at least some of the non-intake time intervals.

8. A method in accordance with claim 7 wherein the device further comprises first and second valves, each of the first and second valves being movable between opened and closed positions, the first valve being configured and adapted to prevent fluid from flowing through the fluid inlet opening when in its closed position and to allow fluid to flow through the fluid inlet opening when in its opened position, the second valve being configured and adapted to prevent fluid from flowing through the fluid outlet opening when in its closed position and to allow fluid to flow through the fluid outlet opening when in its opened position, the first valve being in its opened position and the second valve being in its closed position during the intake time intervals, the first valve being in its closed position and the second valve being in its opened position during the expulsion time intervals.

9. A method in accordance with claim 8 further comprising the step of cycling each of the first and second valves between their opened and closed positions by creating pressure differentials that cause the first and second valves to move between their opened and closed positions.

10. A method in accordance with claim 7 wherein at least one-hundred and fifty intake time intervals occur within one second.

11. A method in accordance with claim 7 wherein the intake time intervals are equal in duration and coincide with the non-expulsion time intervals, and wherein the expulsion time intervals are equal in duration and coincide with the non-intake time intervals.

12. A method in accordance with claim 7 wherein the device is an aircraft and wherein the step of providing the aircraft further comprises providing the aircraft in a manner such that the aircraft has a wing, the airfoil constituting a portion of the wing and the fluid outlet opening being separate from the wing.

13. A method in accordance with claim 7 wherein the device is an aircraft and wherein the step of providing the aircraft further comprises providing the aircraft in a manner such that the aircraft has a wing, the wing comprising a flap that forms a portion of the airfoil and that is movable relative to another portion of the airfoil, the fluid inlet opening extending through a portion of the exterior surface of the airfoil that forms a portion of the flap.

14. A method in accordance with claim 7 wherein the steps of intermittently drawing fluid into the fluid passageway and intermittently expelling fluid from the fluid passageway occur via linearly reciprocating a piston.

15. A method comprising:
providing a device having an airfoil, fluid inlet and fluid outlet openings, and a valve, the airfoil having an exterior surface and a fluid passageway, the fluid inlet opening extending through the exterior surface of the airfoil, the fluid outlet opening being separate from the fluid inlet opening, the valve being movable between opened and closed positions, the valve being configured and adapted to prevent fluid from flowing through the inlet opening when in its closed position and to allow fluid to flow through the inlet opening when in its opened position;
drawing fluid into the fluid passageway of the airfoil from an environment external to the device via the fluid inlet opening, the drawing of fluid into the fluid passageway via the fluid inlet opening occurring with the first valve in its opened position;
expelling fluid from the fluid passageway of the airfoil into the external environment via the fluid outlet opening.

16. A method in accordance with claim 15 wherein the valve constitutes a first valve and wherein the device further comprises a second valve, the second valve being movable between opened and closed positions and being configured and adapted to prevent fluid from flowing through the outlet opening when in its closed position and to allow fluid to flow through the outlet opening when in its opened position, the step of drawing fluid into the fluid passageway occurring with the second valve in its closed position and the step of expelling fluid from the fluid passageway occurring with the first valve in its closed position and the second valve in its opened position.

17. A method in accordance with claim 16 further comprising a step of cycling each of the first and second valves between their opened and closed positions at a rate of at least one-hundred and fifty Hertz.

18. A method in accordance with claim 16 wherein the device further comprises a linearly reciprocating member and wherein the steps of drawing fluid into the fluid passageway and expelling fluid from the fluid passageway occur via linearly reciprocating the linearly reciprocating member.

19. A method in accordance with claim 17 wherein the step of cycling each of the first and second valves between their opened and closed positions is performed by creating pressure differentials that cause the first and second valves to move between their opened and closed positions.

20. A method in accordance with claim 15 wherein the device is an aircraft and wherein the step of providing the aircraft further comprises providing the aircraft in a manner such that the aircraft has a wing, the wing comprising a flap that forms a portion of the airfoil and that is movable relative to another portion of the airfoil, the fluid inlet opening extending through a portion of the exterior surface of the airfoil that forms a portion of the flap.

21. A method in accordance with claim 15 wherein the device is an aircraft and wherein the step of providing the aircraft further comprises providing the aircraft in a manner such that the aircraft has a wing, the airfoil constituting a portion of the wing and the fluid outlet opening being separate from the wing.

\* \* \* \* \*